United States Patent [19]

Witucki

[11] Patent Number: 4,923,755

[45] Date of Patent: May 8, 1990

[54] ORGANOSILICONE RESIN COATING COMPOSITIONS

[75] Inventor: Gerald L. Witucki, Midland, Mich.

[73] Assignee: Dow Corning Corporation, Midland, Mich.

[21] Appl. No.: 329,466

[22] Filed: Mar. 28, 1989

[51] Int. Cl.$^5$ .............................................. B32B 9/04
[52] U.S. Cl. .................................. 428/447; 528/23; 525/477
[58] Field of Search ................. 525/477, 23

[56] References Cited

U.S. PATENT DOCUMENTS

| | | | |
|---|---|---|---|
| 3,624,030 | 11/1971 | Pruvost et al. | 260/46.5 |
| 3,846,358 | 11/1974 | Roedel | 260/18 S |
| 4,113,665 | 9/1978 | Law et al. | 260/37 SB |
| 4,160,858 | 7/1979 | Roedel | 528/14 |
| 4,482,670 | 11/1984 | Saam et al. | 528/23 |
| 4,508,887 | 4/1985 | Kohl | 528/21 |
| 4,585,705 | 4/1986 | Broderick et al. | 428/447 |
| 4,780,338 | 10/1988 | Saad et al. | 427/387 |

FOREIGN PATENT DOCUMENTS 2345923 9/1978 Fed. Rep. of Germany .
2067212 7/1981 United Kingdom .

Primary Examiner—Melvyn I. Marquis
Assistant Examiner—Karen A. Hellender
Attorney, Agent, or Firm—Alexander Weitz

[57] ABSTRACT

Curable organosilicone resin coating compositions are disclosed wherein part or all of the solvent ordinarily present in conjunction with a conventional hydroxyl functional organosiloxane resin copolymer is replaced with a reactive liquid silicone resin having an increased flash point and reduced volatility relative to a prior art reactive diluent. The liquid silicone resin employed is a reaction product prepared by hydrolyzing, and the neutralizing, an equilibrated mixture of (i) a phenylsilane and (ii) a polydimethylsiloxane, the equilibration reaction being facilitated by a perfluoroalkane sulfonic acid (iii).

14 Claims, No Drawings

ORGANOSILICONE RESIN COATING COMPOSITIONS

BACKGROUND OF THE INVENTION

The present invention relates to improved curable organosilicone resin coating compositions having low solvent content. More particularly, the present invention relates to compositions comprising a conventional hydroxyl functional organosiloxane resin copolymer, wherein part or all of the solvent ordinarily present in coating compositions of the resin copolymer is replaced with a reactive liquid silicone resin having an increased flash point.

Silicone resins having trifunctional siloxy units and difunctional siloxy units are well known in the art and have been used extensively in the formulation of paints, varnishes, molding compounds and encapsulating compositions. Typically, these resins contain residual hydroxyl functionality, and occasionally residual alkoxy functionality, which may be condensed by means of heat and/or catalysis in order to cure the resins. Resins of this type are generally utilized in the form of solutions in organic solvents since they are often solids, or, at best, very viscous liquids at ordinary temperatures.

Thus, for example, U.S. Pat. No. 3,846,358 to Roedel discloses a process for producing a solid silicone resin by a complex sequence comprising partially hydrolyzing and alkoxylating an organohalosiloxane mixture with an alcohol and water, adding more alcohol, removing the acid formed by distillation adjusting the acidity of the intermediate, adding additional water and alcohol and finally adjusting the solids content.

In U.S. Pat. No. 4,160,858, Roedel discloses a similar process for producing a solventless silicone resin having a viscosity of 200 to 5,000 cP at 25° C. wherein an alkali metal hydroxide is emPloyed to reduce the acidity and excess alcohol and water are stripped off in a final step.

Silicone resins may also be prepared directly from alkoxysilanes and polysiloxanes, as shown in U.S. Pat. No. 4,113,665 to Law et al. which teaches binder compositions for chemically resistant coatings. These binder resins are formed by reacting a trialkoxysilane with an aliphatic polyol and/or a silicone intermediate having hydroxyl or alkoxy terminal groups and a molecular weight of about 500 to 2,000 in the presence of an aqueous acidic solution.

Solventless silicone coating compositions are disclosed by Saad et al. in U.S. Pat. No. 4,780,338. In this invention, a silicone resin containing hydroxy, alkoxy or acyloxy functionality is blended with a diorganopolysiloxane fluid having functional groups which react with the alkoxy or acyloxy groups of the silicone resin and a condensation catalyst to cure the composition.

GB No. 2,067,212 A to Toray Silicone Company discloses room temperature curing silicone resins comprising hydroxy-functional organopolysiloxane resin, low molecular weight hydroxyl-terminated diorganopolysiloxane and an organosilane having 2 or 3 hydrolyzable groups, or a partial hydrolysis product thereof. These compositions can be cured using tin or titanate catalysts.

The use of various acids and bases as catalysts in the polymerization of silanol-terminated siloxanes is known in the art. In this regard, perfluoroalkyl sulfonic acids, inter alia, have been utilized to promote the condensation of silanol-functional siloxanes to form high molecular weight fluids, gums and copolymers. In U.S. Pat. No. 4,508,887, Kohl discloses a method for preparing a polyorganosiloxane by reacting an inert medium mixture of at least one hydroxyl-containing organosiloxane in the presence of a catalytically effective amount of a catalyst consisting essentially of an amine salt of an acid and an unreacted acid selected from fluorinated alkanesulfonic acids or sulfuric acid.

Such acids have also found utility as catalysts during the partial hydrolysis of chlorosilane mixtures. German Laid Open Publication DT 2,345,923 Al to Bayer AG discloses chlorine-functional fluids and resins prepared by the partial hydrolysis of various chlorosilanes in the presence of perfluoroalkyl sulfonic acids.

U.S. Pat. No. 4,585,705 to Broderick et al. discloses a release coating composition comprising a conventional hydroxyl functional siloxane resin containing methyl, phenyl, phenylmethyl and diphenyl siloxane units, the reactive diluent methyltrimethoxysilane, a fluid polysiloxane "slip" component and a curing catalyst. The conventional hydroxyl functional siloxane resins are generally solids and must be dissolved in an inert solvent in order to be effectively aPplied as a coating composition. Thus, the above cited patent to Broderick et al. advanced the art in that a reactive solvent replaced some, or all, of the usual inert solvent. In this way, a 100% reactive coating composition could be obtained. However, an inherent limitation of such a composition remains: the volatility of the methyltrimethoxysilane is actually greater than some of the conventional solvents it replaces (methyltrimethoxysilane has a closed cup flash point of about 47° F.). Thus, the hazards related to fire and explosion are not relieved by the inclusion of the above noted reactive diluent. Moreover, when curing the compositions of the Broderick et al. patent at elevated temperatures, a considerable amount of the methyltrimethoxysilane has been found to volatilize, even though it is intended to react with the other components. This evaporation of reactive diluent not only wastes a costly component, but contributes to total volatile organic compounds (VOC) emission, counter to current trends in air quality standards.

SUMMARY OF THE INVENTION

The difficulties noted with respect to the reactive diluent employed by Broderick et al., cited supra, have been overcome by the present invention by replacing all or part of the solvents, used in conjunction with conventional resins in coating applications, with a reactive liquid silicone resin having reduced volatility relative to the above mentioned methyltrimethoxysilane. None of the above recited references teaches the preparation of the reactive silicone coating compositions of the present invention. These compositions are particularly suitable in modern coating applications since they result in compositions having low VOC emissions. Moreover, it has been discovered that modification of conventional resins according to the present invention often results in improved flexibility of the conventional resins. The present invention therefore relates to a solventless silicone coating composition comprising (A) 100 parts by weight of a hydroxyl functional organosiloxane resin copolymer comprised of at least two units selected from the group consisting of MeSiO$_{3/2}$ units, Me$_2$SiO$_{2/2}$ units, PhMeSiO$_{2/2}$ units, PhSiO$_{3/2}$ units, Ph$_2$SiO$_{2/2}$ units and PrSiO$_{3/2}$ units, in which Me denotes a methyl radical, Ph denotes a phenyl radical and Pr denotes a Propyl radical, said resin copolymer having 0.5 to 6 weight percent residual hydroxyl radicals attached to the silicon atoms thereof, a total molar organic group to silicon ratio of 1 to 1.7 and a total molar phenyl group to silicon ratio of 0.35 to 0.85; and (B) from about 1 to 100 parts by weight of a liquid silicone resin composition prepared by a process comprising
(I) reacting a mixture consisting essentially of
  (i) a phenylsilane having the general formula PhSi(OR)$_3$ wherein R is selected from the group consisting of methyl, ethyl, Propyl and acetyl radicals and Ph denotes a phenyl radical,
  (ii) a polydimethylsiloxane and
  (iii) an equilibrating amount of an acid catalyst having the formula

ZSO$_3$H wherein Z is a perfluoroalkYl group having 1 to 10 carbon atoms molar ratio of said polYdimethylsiloxane (ii) to said phenylsilane (i) being between about 1:9 and about 9:1,
(II) hydrolyzing the reaction product formed in step (I) with sufficient water to provide from about 0.5 to about 1 mole of residual -OR functionality per 100 parts by weight of said liquid silicone resin and
(III) neutralizing said acid catalyst (iii).

DETAILED DESCRIPTION OF THE INVENTION

The solventless silicone coating composition of the present invention comprises a homogeneous mixture of (A) a hydroxyl functional organosiloxane resin copolYmer and (B) a liquid silicone resin.

The hydroxyl functional organosiloxane resin copolymer (A) is selected from conventional resins comprising at least two units selected from the group consisting of MeSiO$_{3/2}$ units, Me$_2$SiO$_{2/2}$ units, PhMeSiO$_{2/2}$ units, PhSiO$_{3/2}$ units, Ph$_2$SiO$_{2/2}$ units and PrSiO$_{3/2}$ units, wherein Me, Ph and Pr hereinafter denote methyl, phenyl and propyl radicals, respectively. For the purposes of the present invention, the conventional resin has from 0.5 to 6 weight percent residual hydroxyl radicals attached to the silicon atoms thereof, a total molar organic group to silicon ratio of 1 to 1.7 and a total molar phenyl group to silicon ratio of 0.35 to 0.85.

Resins suitablY employed a comPonent (A) are well known in the art and many are available commercially. They are typically prepared by hydrolyzing the respective chlorosilanes in an aromatic solvent, such as toluene and xylene. These resins are typically solids and thus require the presence of a solvent in order to be used as coating compositions. Generally, the solvent employed in their preparation is retained to some extent for this purpose.

The liquid silicone resin (B) is a reaction product prepared by hydrolyzing, and then neutralizing, an equilibrated mixture of (i) a phenylsilane and (ii) a polydimethylsiloxane, the equilibration reaction being facilitated by a strong acid catalyst (iii).

Component (i) of liquid silicone resin (B) may be represented by the formula

PhSi(OR)$_3$ wherein R is selected from the grouP consisting of methyl, ethyl, propyl and acetyl radicals. It is preferred that R is either a methyl or ethyl radical and it is particularlY preferred that component (i) is phenyltrimethoxysilane.

The polydimethylsiloxane (ii) of liquid silicone resin (B) may be a linear polydimethylsiloxane. The selection of terminal groups for the linear polydimethylsiloxane is not critical for the purpose of the present invention provided that an inert terminal group, such as trimethylsilyl, is not employed when the degree of polymerization of the polydimethylsiloxane is less than about 200. Thus, generic examples of suitable terminal groups include trialkylsilyl, alkoxydialkylsilyl, aryldialkylsilyl and hydroxydialkylsilyl groups. Specific terminal groups which may be used include Me$_3$Si-, MeO(Me$_2$)Si-, and HO(Me$_2$)Si-. Preferably, the end group is HO(Me$_2$)Si-.

Although component (ii) is described as a polydimethylsiloxane, up to about 10 mole percent of siloxane units containing alkyl groups having 2 to 8 carbon atoms, phenyl groups or trifluoropropyl groups may be copolymerized with the dimethylsiloxane units to still be within the scope of this invention. Thus, copolymers of dimethylsiloxane units with phenylmethylsiloxane, methylhexylsiloxane or methyltrifluoropropylsiloxane units are specific examples of this component. It is preferred that when component (ii) is a linear polydimethylsiloxane, that it be the dimethyl homopolymer.

Alternatively, and preferably, polydimethylsiloxane (ii) is selected from at least one polydimethylcyclosiloxane having the formula (Me$_2$SiO)$_x$ wherein x is an integer between 3 and about 10, inclusive. For the purposes of the present invention, this preferred polydimethylsiloxane is a mixture of such cyclic siloxanes.

Component iii of the liquid silicone resin (B) is a strong acid capable of efficiently redistributing (i.e., equilibrating) siloxane bonds. It has been observed that weak acids, such as phosphoric or acetic, do not redistribute siloxane bonds and therefore do not produce the liquid silicone resins of the present invention. Suitable acids are represented by the general formula

ZSO$_3$H wherein Z is a perfluoroalkyl group having 1 to about 10 carbon atoms. Examples of suitable acid catalysts include perfluoromethane sulfonic acid, perfluoroethane sulfonic acid, perfluorohexane sulfonic acid, perfluorooctane sulfonic acid and perfluorodecane sulfonic acid. It is preferred that component (iii) is perfluoromethane sulfonic acid.

In order to prepare the liquid silicone resin (B), phenylsilane (i) and olydimethylsiloxane (ii) are mixed in a mole ratio of 1:9 to 9:1 and reacted in the presence of an equilibrating amount of catalyst (iii). The reaction is carried out under an inert atmosphere, such as nitrogen or argon, and the preferred mole ratio of components (i) to component (ii) is 1:2 to 2:1. The term "equilibrating amount" as used herein denotes a sufficient amount of acid catalyst (iii) to efficiently rearrange the siloxane bonds of reactants (i) and (ii) so as to provide a substantially equilibrated product of reaction within 3-5 hours at temperatures between about 60 and 80° C. This amount may readily be determined by those skilled in the art by following the disappearance of the reactants using, e.g., gas chromatography, the acid in the sample being neutralized before each such determination. Thus, for example, when the catalyst is the preferred perfluoromethane sulfonic acid, it is employed at about 0.04 to 0.1 weight percent of the total of components (i) and (ii). This amount of perfluoromethane sulfonic acid is sufficient to equilibrate the above mentioned components within about 4 hours at 70° C.

After equilibration of components (i) and (ii) is attained, the reaction product is hydrolyzed with sufficient water to provide from about 0.5 to about 1 mole of residual—OR functionality per 100 parts by weight of liquid silicone resin (B). As should be apparent to the skilled artisan, the molar units and weight units must, of course, be consistent (e.g., gram-moles and grams, respectively). The basic reactions relied upon to calculate the amounts of water to be used in the hydrolysis step are: (1) the hydrolysis of the—OR groups on the above described equilibrated product to form silanol groups; and (2) condensation of the silanol groups to form siloxane bonds. The net effect of these reactions, assuming the complete condensation of all silanol groups formed, requires the employment of one half mole of water for the hydrolysis of each mole of—OR groups. Using this assumption, in combination with the above mentioned range of the ratio of the polydimethylsiloxane to the phenylsilane, one skilled in the art can readily calculate the approximate amounts of the ingredients to be used in forming the liquid silicone resin compositions having from about 0.5 to about 1 mole of residual—OR functionality per 100 parts by weight of said liquid silicone resin. In practice, it has been found that, when R is methyl, the calculated (i.e., theoretical methoxy content is usually close to the analytically determined value thereof. Preferably, when R is methyl, the final liquid silicone resin according to the present invention has from about 0.5 to 0.65 moles of residual methoxy functionality per 100 parts by weight; of the liquid silicone resin (B), a value of about 0.58 being most preferred. The hydrolysis step may be carried out at temperatures between about 18 and 70° C., but preferably below the boiling point of the alcohol (e.g., MeOH) or acetic acid formed during the hydrolysis. This reaction should be carried out for at least one hour, whereupon the reactants are referably heated to reflux and the alcohol or acetic acid formed is removed by distillation.

Finally, the acid catalyst is neutralized and the product stripped under vacuum to remove the remaining alcohol, or acetic acid, byproduct as well as other impurities. The product is then cooled and filtered.

It has been noted that the actual amount cf residual —OR functionality left on the liquid silicone resin has been found to be critical in formulating the compositions of the Present invention. For example, when less than about 0.5 moles of residual—OR functionality per 100 parts by weight of the liquid silicone resin remains (e.g., corresponding to approximately 15 weight percent methoxy the compositions tend to gel upon storage under ordinary conditions. On the other hand, when the—OR content is above about 1 moles of residual—OR functionality per 100 parts by weight of said liquid silicone resin (e.g., corresPonding to 30 weight percent methoxy), the liquid silicone resins have such a low molecular weight that they tend to evaporate at the elevated temperatures often employed in curing the compositions of the present invention.

In order to prepare the organosilicone resin coating compositions of the present invention, from about 1 to 100 parts by weight of liquid silicone resin (B) are uniformly mixed with 100 parts by weight of hydroxyl functional organosiloxane resin copolymer (A). The mixing may be carried out at ordinary temperatures provided a homogeneous solution or dispersion results. Since most of the hydroxyl functional organosiloxane resin copolymers are solids at ordinary temperatures, it is often necessary to first dissolve component (A) in a suitable solvent, such as toluene, xylene, naphtha, and isobutylisobutyrate, before blending with the liquid silicone resin (B). Indeed, the solvent already present in many of the commercial hydroxyl functional organosiloxane resin copolymers is generally sufficient for this purpose. The solvent may be removed by a vacuum strip operation to provide a 100% reactive composition if it is judged, that its viscosity is low enough for practical coating applications. In some cases, the solid hydroxyl functional organosiloxane resin copolymer (A) may be mixed directly with liquid silicone resin (B) if the combination is heated slightly.

Preferred embodiments of the present invention utilize phenyltrimethoxysilane and a mixture of polydimethylcyclosiloxanes in a mole ratio of about 2:1, respectively, for the preparation of the liquid silicone resin (B), trifluoromethane sulfonic acid being the preferred equilibration catalyst. From 10 to 60 parts by weight of this component (B) is then uniformly mixed with 100 parts by weight of one of the hydroxyl functional organosiloxane resin copolymers (A).

Because the liquid silicone resin (B) contains residual alkoxy or acetoxy functionality and the hydroxyl functional organosiloxane resin copolymer (A) contains residual silanol functionality, cure of the coating compositions of the present invention may be hastened by the addition of catalysts known in the art to promote the hydrolysis of the—OR groups and the condensation of—OR and SiOH groups to form a three-dimensional siloxane network. Catalysts suitable for this purpose may be selected from the organotitanates, such as tetraisopropyl titanate and tetrabutyl titanate and organometallic compounds, such as dibutyltin dilaurate, tin octoate, dibutyltin diacetate, zinc octoate, cobalt octoate, cobalt naphthanate and cerium naphthanate. Typically, from about 1 to 10 parts by weight of the catalyst are employed for each 100 parts by weight of the solventless silicone coating composition.

The compositions of the present invention may further be compounded with various fillers, such as titanium dioxide, mica, iron oxide and aluminum flake, pigments, thermal stabilizers, flow agents and other additives commonly employed in the formulation of coating compositions.

In use, the compositions of the present invention may be applied to various substrates by any of the conventional coating techniques, such as spraying, dipping, brushing or by the use of a doctor blade.

The liquid silicone resin compositions of the present invention find utility in the preparation of protective coatings for metal, glass and plastic substrates, corrosion resistant high temperature paints, release coatings for bakeware, binders for masonry water repellant and decorative topcoat for appliances and tanks, inter alia.

EXAMPLES

The following examples are presented to further illustrate the compositions of the present invention, but are not to be construed as limiting the invention, which is delineated in the appended claims. All parts and percentages in the examples are on a weight basis and measured properties were obtained at 25° C. unless indicated to the contrary.

The following materials were employed in the preparation of the illustrative and comparative examples:

LSR 1—A liquid silicone resin was prepared by mixing under a nitrogen purge 78 parts of phenyltrimethoxysilane and 14 parts of a mixture of polycyclosiloxanes having the formula $(Me_2SiO)_x$, wherein Me hereinafter denotes a methyl radical and x had a value between 3 and 10. The mixture was stirred and 0.05 parts of trifluoromethane sulfonic acid was added. The catalyzed mixture was then slowly heated to 70° C. and stirred at this temperature for about 4 hours. Upon cooling to about 34° C., 6.8 parts of deionized water was added. The resulting exothermic reaction brought the temperature of the mixture to about 70° C.;. Stirring was continued for about another hour without further application of heat. Powdered calcium carbonate (0.3 part was added to neutralize the acid catalyst and a vacuum (about 40 mm Hg) was applied while slowly heating to about 156° C. This temperature was held for about 4 hours to strip off volatiles. The product was cooled and filtered using Celite filter aid. It had a residual methoxy functionality of about 18% (i.e., 0.58 moles —OMe per 100 grams of the LSR 1), a viscosity of about 105 cP and a closed cup flash point of about 150° F.

LSR 2—A liquid silicone resin similar to LSR 1 and prepared in a like manner, wherein the quantities of phenyltrimethoxysilane, polycyclosiloxanes and deionized water were 56, 41 and 2.8 parts, respectively. The resulting liquid resin had a residual methoxy functionality of about 17% (i.e., 0.55 moles—OMe per 100 grams of the LSR 2), a viscosity of about 15 cP and a closed cup flash point of about 99° F.

RESIN 1—A solid silicone resin consisting essentially of $MeSiO_{3/2}$, $PhSiO_{3/2}$, $PhMeSiO_{2/2}$ and $Ph_2SiO_{2/2}$ units, wherein Ph hereinafter denotes a phenyl group, in the molar ratio of 45:40:5:10. This resin was Prepared by hydrolyzing the respective chlorosilanes in toluene and had a residual hydroxyl functionality of 5.0%.

RESIN 2—A 50% solids solution in xylene of a silicone resin consisting essentially of $MeSiO_{3/2}$, $PhSiO_{3/2}$, $PhMeSiO_{2/2}$ and $Ph_2SiO_{2/2}$ units in the molar ratio of 25:15:50:10. This resin was also prepared by hydrolyzing the respective chlorosilanes and had a residual hydroxyl functionality of 0.5% (on a solids basis).

RESIN 3—A 50% solids solution in xylene/toluene of a silicone resin consisting essentially of $MeSiO_{3/2}$, $PhSiO_{3/2}$, $Me_2SiO_{2/2}$ and $Ph_2SiO_{2/2}$ units in the molar ratio of 25:37:19:19. This resin was also prepared by hydrolyzing the respective chlorosilanes and had a residual hydroxyl functionality of 0.5% (on a solids basis).

TBT=Tetra(n-butyl) titanate catalyst.

CO=A 6% solution of cobalt octoate catalyst in Rule 66 mineral spirits.

ZO=An 8% solution of zinc octoate catalyst in Rule 66 mineral spirits.

The following test methods were utilized in characterizing the materials described infra:

Pencil Hardness—ASTM Test Method D 3363.

Slip Angle—An indication of coefficient of friction, this test basically consisted of placing a cheesecloth-covered weight (500 grams) on the coated panel and tilting the panel. The angle of incline from the horizontal at which this weight started to slide was recorded.

Impact Resistance—ASTM D2794.

T-Bend—ASTM D4145.

The aforementioned ASTM (American Society for Testing and Materials) test methods are well known in the art and said methods are hereby incorPorated by reference

EXAMPLES 1–6

Homogeneous blends consisting of 40% LSR 1 and 60% of RESINS 1, 2 and 3, respectively, were prepared at room temperature to form coating compositions, as indicated in Table 1. To each blend there was added 0.5% ©of CO catalyst and 0.5% TBT catalyst, on a solids basis. These coating compositions were used to dip-coat steel panels, which were subsequently dried at room temperature for ten minutes and then cured at 450° F. for 15 minutes. The cured films, which all had a good appearance, were tested according to the above described methods, as were similarly prepared films of the individual RESINS 1, 2 and 3 (Comparative Examples 4, 5 and 6, respectively).

TABLE 1

|  | Example | | | (Compartive) Example | | |
| --- | --- | --- | --- | --- | --- | --- |
|  | 1 | 2 | 3 | 4 | 5 | 6 |
| Coating Composition | | | | | | |
| Parts LSR 1 | 40 | 40 | 40 | — | — | — |
| Parts RESIN 1 | 60 | — | — | 100 | — | — |
| Parts RESIN 2 | — | 60 | — | — | 100 | — |
| Parts RESIN 3 | — | — | 60 | — | — | 100 |
| Cured Film Properties | | | | | | |
| Pencil Hardness | 5 H | B | H | 7 H | 5 B | B |
| Slip Angle (Degrees) | 3 | 3 | 3 | 3 | 3 | 3 |
| Impact Resistance | Pass | Pass | Pass | Fail | Pass | Fail |

The compositions of the present invention not only provided cured coatings which showed some improvement in flexibility (as evidenced by the impact resistance reported in Table 1), but they illustrate systems having reduced solvent content versus conventional silicone resins.

EXAMPLE 7

A flowable, 100% reactive resin system was prepared by dissolving 234 grams of RESIN 1 in 75 grams of acetone at 50° C. To this resin solution, there was added 156 grams of LSR 2 to form a homogeneous mixture. The mixture was then stripped of solvent while still warm under a reduced pressure. The resultant solventless resin had a solids content of about 88% (measured by heating a small sample at 135° C. for 3 hours) and a viscosity of about 32,000 cP.

To 40 grams of the above solventless resin there was added 0.2 grams of ZO and 0.2 grams of TBT catalysts. Draw-downs on steel panels were made using the wire-wound bars indicated in Table 2, whereupon the coatings were allowed to dry at room temperature for 10 minutes and then cured at 500° F. for 20 minutes.

TABLE 2

|  | Draw-down Bar Number | | | |
| --- | --- | --- | --- | --- |
|  | #3 | #18 | #24 | #32 |
| Cured Film Properties | | | | |
| Film Thickness (Mils) | 0.5 | 1.9 | 2.5 | 2.9 |
| Pencil Hardness | 2 H | F | F | HB |
| Impact Resistance | Pass | Fail | Fail | Fail |
| T-Bend | Pass | Pass | Fail | Fail |

The resin system of this example is thus well suited for use as a bakeware coating, where the typical coating thickness is in the range of 0.2 mil.

I claim:

1. A composition comprising:
   (A) 100 parts by weight of a hydroxyl functional organosiloxane resin copolymer comprised of at least two units selected from the group consisting of $MeSiO_{3/2}$ units, $Me_2SiO_{2/2}$ units. $PhMeSiO_{2/2}$ units. $PhSiO_{3/2}$ units, $Ph_2SiO_{2/2}$ units and $PrSiO_{3/2}$ units, in which Me denotes a methyl radical, Ph denotes a phenyl radical and Pr denotes a propyl radical, said resin copolymer having 0.5 to 6 weight percent residual hydroxyl radicals attached to the silicon atoms thereof, a total molar organic group to silicon ratio of 1 to 1.7 and a total molar phenyl group to silicon ratio of 0.35 to 0.85; and
   (B) from about 1 to 100 parts by weight of a liquid silicone resin composition prepared by a process comprising
   (I) reacting a mixture consisting essentially of
      (i) a phenylsilane having the general formula $PhSi(OR)_3$ wherein R is selected from the group consisting of methyl, ethyl, propyl and acetyl radicals and Ph denotes a phenyl radical,
      (ii) a polydimethylsiloxane and
      (iii) an equilibrating amount of an acid catalyst having the formula $ZSO_3H$ wherein Z is a perfluoroalkyl group having 1 to 10 carbon atoms, molar ratio of said polydimethylsiloxane (ii) to said phenylsilane (i) being between about 1:9 and about 9:1,
   (II) hydrolyzing the reaction product formed in step (I) with sufficient water to provide from about 0.5 to about 1 mole of residual—OR functionality per 100 parts by weight of said liquid silicone resin and
   (III) neutralizing said acid catalyst (iii).

2. The composition according to claim 1, wherein the R group of said phenylsilane (i) is selected from the group consisting of methyl and ethyl radicals.

3. The composition according to claim 2, wherein said polydimethylsiloxane ii) is a mixture of polydimethylcyclosiloxanes.

4. The composition according to claim 3, wherein said acid catalyst iii is trifluoromethane sulfonic acid.

5. The composition according to claim 4, wherein said phenylsilane (i) is phenyltrimethoxysilane.

6. The composition according to claim 5, wherein the mole ratio of said phenyltrimethoxysilane (i) to said polydimethylsiloxane (ii) is 1:2 to 2:1 and said liquid silicone resin (B) has 0.48 to 0.65 mole of residual—OR functionality per 100 parts by weight of said liquid silicone resin.

7. The composition according to claim 6, wherein from 10 to 60 parts by weight of said liquid silicone resin (B) are used for each 100 parts by weight of said hydroxyl functional organosiloxane resin copolymer (A).

8. An article comprising a solid substrate coated with the curable composition of claim 1.

9. An article comprising a solid substrate coated with the curable composition of claim 2.

10. An article comprising a solid substrate coated with the curable composition of claim 3.

11. An article comprising a solid substrate coated with the curable composition of claim 4.

12. An article comprising a solid substrate coated with the curable composition of claim 5.

13. An article comprising a solid substrate coated with the curable composition of claim 6.

14. An article comprising a solid Substrate coated with the curable composition of claim 7.

* * * * *